United States Patent
Watanabe

(10) Patent No.: US 7,626,765 B2
(45) Date of Patent: Dec. 1, 2009

(54) BENT ZOOM LENS

(75) Inventor: Kazuya Watanabe, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 377 days.

(21) Appl. No.: 11/641,817

(22) Filed: Dec. 20, 2006

(65) Prior Publication Data
US 2007/0139788 A1    Jun. 21, 2007

(30) Foreign Application Priority Data
Dec. 21, 2005    (JP)    ............... 2005-367739

(51) Int. Cl.
*G02B 15/14*    (2006.01)
(52) U.S. Cl. ..................... 359/683; 359/676
(58) Field of Classification Search ................. 359/676, 359/683
See application file for complete search history.

(56) References Cited

U.S. PATENT DOCUMENTS

| | | | |
|---|---|---|---|
| 5,847,882 A | 12/1998 | Nakayama | |
| 6,754,446 B2 * | 6/2004 | Hagimori et al. | 396/72 |
| 7,068,441 B2 * | 6/2006 | Kim | 359/686 |
| 7,173,768 B2 * | 2/2007 | Kushida et al. | 359/676 |
| 7,505,210 B2 * | 3/2009 | Kuroda et al. | 359/676 |
| 2006/0274426 A1 | 12/2006 | Sueyoshi | |

FOREIGN PATENT DOCUMENTS

| | | |
|---|---|---|
| EP | 1 630 584 | 3/2006 |
| JP | 3486474 B2 | 10/2003 |
| JP | 2004-354869 A | 12/2004 |

* cited by examiner

*Primary Examiner*—Scott J Sugarman
(74) *Attorney, Agent, or Firm*—Foley & Lardner LLP

(57) ABSTRACT

The bent zoom lens is configured to include, arranged in order from an object side, a first lens group GR1 having a positive refractive power, a second lens group GR2 having a negative refractive power, a third lens group GR3 having a positive refractive power, a fourth lens group GR4 having a negative refractive power, and a fifth lens group GR5 having a positive refractive power. The first lens group GR1 includes a single piece of meniscus lens having a negative refractive power and having a convex surface directed toward an object side, a prism that bends an optical path, and a single piece of double-convex lens having a positive refractive power.

12 Claims, 10 Drawing Sheets

MIDDLE END

BENT ZOOM LENS

BACKGROUND OF THE INVENTION

1. Field of the Invention

The present invention relates to a bent zoom lens used in an imaging apparatus.

2. Description of the Related Art

Recently, it is demanded to further downsize a compact imaging apparatus such as a digital still camera and a video camera. Accordingly, it is demanded to downsize an imaging lens, particularly a zoom lens, to be installed in a compact imaging apparatus. Particularly, it is demanded for a zoom lens installed in a digital still camera to have an angle of view of 70 degrees or wider at a wide-angle end. In addition, it is demanded to improve an optical performance of an imaging lens corresponding to improved pixel resolution of an imaging device to be installed in a compact imaging-apparatus.

To meet such demands, a rear-focus zoom lens has been proposed that is configured to focus by shifting lens groups other than a first lens group arranged at a position closest to an object (for example, Japanese Patent No. 3486474).

In the above rear-focus zoom lens, an entire lens system is downsized relatively easily, while obtaining an image-formation property suitable for a solid-state imaging device having many pixels. However, the optical path is constituted in a rectilinear configuration, thereby limiting length of the lens system to be shortened.

As such, a zoom lens has been proposed to further shorten a total length of a lens system, which zoom lens is configured to include a prism arranged in an optical path from a first lens group to an image surface to bend the optical path midway (for example, Japanese Patent Application Laid-Open No. 2004-354869).

The above zoom lens having the prism is configured to adopt an up-and-down direction or right-and-left direction as a movable direction of lenses upon changing a magnification to eliminate protruded portions or protruded movable portions upon imaging, and configured to downsize the first lens group having the prism to thereby realize further downsizing with reduction in thickness. However, when an image-formation magnification of a fifth lens group is increased to downsize the lens system, an image is considerably deteriorated only by a slight deviation of a fourth lens group as a focus group from a focusing position. This has resulted in such a problem that an image-formation quality is hardly maintained, due to occurrence of a cause (like a manufacturing error) that disables precise alignment of the focus group with the focusing position.

SUMMARY OF THE INVENTION

It is an object of the present invention to solve at least the above problems in the conventional technologies.

A bent zoom lens according to one aspect of the present invention includes a first lens group including a front-side lens group having a negative refractive power, an optical member that bends an optical path, and a rear-side lens group having a positive refractive power; a second lens group; a third lens group; a fourth lens group; and a fifth lens group, arranged in order from an object side.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
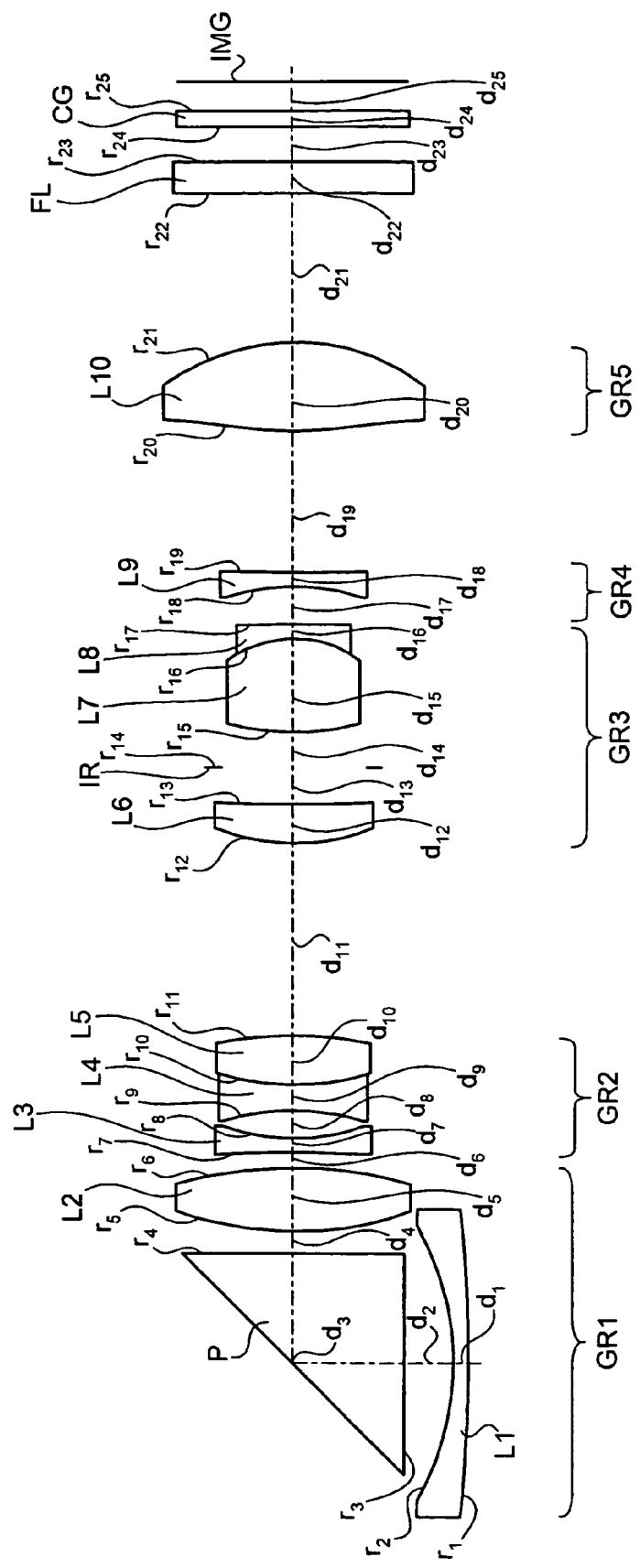
FIG. 1 is a cross-sectional view along an optical axis of a bent zoom lens configuration according to the first embodiment of the present invention.

Exemplary embodiments according to the present invention will be explained below in detail.

A bent zoom lens according to an embodiment of the present invention is configured to include, in an order arranged from an object side: a first lens group having a positive refractive power; a second lens group having a negative refractive power; a third lens group having a positive refractive power; a fourth lens group having a negative refractive power; and a fifth lens group having a positive refractive power. The first lens group is configured to include, in an order arranged from the object side, a front-side lens group having a negative refractive power, an optical member that bends an optical path, and a rear-side lens group having a positive refractive power. The optical member that bends the optical path is constituted of a prism, mirror, or the like.

In the bent zoom lens according to the exemplary embodiment, zooming is performed by moving the second lens group having the same optical axis as the rear-side lens group of the first lens group, and the fourth lens group, in a direction along the optical axis. Further, the bent zoom lens adopts a so-called rear focusing scheme where the fourth lens group is moved in the direction along the optical axis to thereby conduct focusing.

The bent zoom lens according to the exemplary embodiment has the optical member arranged in the first lens group to thereby bend the optical path, so that the bent zoom lens can be shortened in total length as compared with a lens system having a rectilinear optical path. Further, in the bent zoom lens, only the second lens group and the fourth lens group arranged inside the lens system are moved upon zooming or focusing, so that the total length of the lens system is unchanged and always kept constant.

The present invention aims at providing a bent zoom lens that is never deteriorated in image-formation quality, only by just a slight deviation of the focus group from a focusing position due to occurrence of a cause (like a manufacturing error) that disables precise alignment of the focus group with the focusing position. Further, the bent zoom lens is assumed to be used in a compact digital still camera, video camera, and the like, thereby necessitating not only compactization of lenses but also an excellent optical performance matched with an ability of a compact imaging device having many pixels.

As such, the bent zoom lens according to the exemplary embodiment is to desirably meet the following conditional equations.

$$1.0 \leq |\beta_5^2 \times (1-\beta_{4W}^2)| \leq 2.0 \quad (1)$$

$$1.0 \leq |\beta_5^2 \times (1-\beta_{4T}^2)| \leq 2.0 \quad (2)$$

where $\beta_{4W}$ represents an image-formation magnification of the fourth lens group at a wide-angle end when a distance to the object is infinite; $\beta_{4T}$ represents an image-formation magnification of the fourth lens group at a telephoto end when a distance to the object is infinite; and $\beta_5$ represents an image-formation magnification of the fifth lens group when a distance to the object is infinite.

The conditional equations (1) and (2) indicate a relationship between the image-formation magnification of the fourth lens group and the image-formation magnification of the fifth lens group, for avoiding degradation of the image-formation quality. Namely, selecting a combination of the image-formation magnification of the fourth lens group with the image-formation magnification of the fifth lens group in a manner to meet the conditional equations (1) and (2), allows the image-formation quality to be kept excellent without degradation, only by just a slight deviation of the fourth lens group acting as the focus group from a focusing position due to occurrence of a cause (like a manufacturing error) that disables precise alignment of the fourth lens group as the focus group with the focusing position. According to the exemplary embodiment, combinations of the image-formation magnification of the fourth lens group with the image-formation magnification of the fifth lens group that meet the conditional equations (1) and (2), are adopted over a relatively wide range, thereby desirably increasing a freedom of selection of the respective image-formation magnifications.

Here, when the value of $|\beta_5^2 \times (1-\beta_{4W}^2)|$ or $|\beta_5^2 \times (1-\beta_{4T}^2)|$ is made less than 1.0, the movement of the focus group (fourth lens group) for avoiding degradation of the image-formation quality due to manufacturing error is increased, at the wide-angle end when a distance to the object is infinite and at the telephoto end when a distance to the object is relatively short. Particularly, the focus group is disadvantageously increased in moved distance and considerably deteriorated in image-formation quality at the telephoto end, when a distance to the object is relatively short. In turn, when the value of $|\beta_5^2 \times (1-\beta_{4W}^2)|$ or $|\beta_5^2 \times (1-\beta_{2T}^2)|$ exceeds 2.0, the image-formation quality is disadvantageously and considerably deteriorated even by a slight deviation of the focusing position of the focus group.

Further, the image-formation magnification $\beta_5$ of the fifth lens group is to desirably meet the following conditional equation upon considering the conditional equations (1) and (2), when a distance to the object is infinite.

$$|\beta_5| \leq 0.5 \quad (3)$$

This conditional equation (3) is given to maintain an excellent incident angle of light into an image surface. Values of $|\beta_5|$ exceeding 0.5 cause the exit pupil position of the bent zoom lens to be brought excessively close to the image surface, so that the incident angle of light into the image surface is considerably deviated from a right angle. When such a bent zoom lens is installed in a digital still camera, for example, shading is caused when an incident angle of light into an image surface is considerably deviated from a right angle because a light receiving face of an imaging device is located at a position of an image surface, thereby disadvantageously causing degradation of image-formation quality. Note that an effective aperture of the first lens group having the optical member that bends the optical path can be kept small even when the value of $|\beta_5|$ is made small, because the fourth lens group has the negative refractive power and the fifth lens group has the positive refractive power as described above.

Further, this bent zoom lens is to desirably meet the following conditional equation.

$$|\beta_{2T}| \leq 1.0 \quad (4)$$

where $\beta_{2T}$ represents an image-formation magnification of the second lens group at the telephoto end when a distance to the object is infinite.

The conditional equation (4) is given to decide a moving direction of the lens groups upon conducting zooming from the wide-angle end to the telephoto end in the bent zoom lens according to the exemplary embodiment. By meeting the conditional equation, the moving directions of the second lens group and the fourth lens group that cooperatively conduct zooming can be coordinated into one direction, upon conducting zooming from the wide-angle end to the telephoto end. Concretely, zooming can be conducted from the wide-angle end to the telephoto end, by moving the second lens group and the fourth lens group from the object side to toward the image surface side. Since the movements of the lens groups upon zooming are coordinated into one direction toward the image surface side, it becomes unnecessary to take account of a situation where zooming is conducted by moving the lens groups toward the object side, thereby enabling the effective aperture of the first lens group to be downsized.

Further, the following conditional equation is to be preferably met.

$$|R_{4a}|/R_{4b} \leq 1.1 \quad (5)$$

where $R_{4a}$ represents a radius of curvature of a most object side surface of lenses constituting the fourth lens group, and $R_{4b}$ represents a radius of curvature of a most image side surface of the lenses.

Also the conditional equation (5) is given to maintain an excellent incident angle of light into the image surface. Values of $|R_{4a}|/R_{4b}$ exceeding 1.1 cause the exit pupil position of the bent zoom lens to be brought excessively close to the image surface, so that the incident angle of light into the image surface is considerably deviated from a right angle. When such a bent zoom lens is installed in a digital still camera, for example, shading is caused when an incident angle of light into an image surface is considerably deviated from a right angle because a light receiving face of an imaging device is located at a position of an image surface, thereby disadvantageously causing degradation of image-formation quality.

As explained above, the bent zoom lens according to the exemplary embodiment is capable of keeping an image-formation quality excellent without any degradation by meeting the conditional equations (1) and (2), only by just a slight deviation of the focus group from a focusing position due to occurrence of a cause (like a manufacturing error) that disables precise alignment of the focus group with the focusing position. Nonetheless, it becomes possible to provide a bent zoom lens more excellent in image-formation quality, by meeting not only the conditional equations (1) and (2) but also the conditional equations (3) and (5) in this order. Note that even when only one of the conditional equations (3) and (5) is met, it is possible to provide a bent zoom lens excellent in image-formation quality. Additionally meeting the conditional equation (4) allows the effective aperture of the first lens group to be reduced, thereby optimally downsizing the lens system.

Note that the effects prospected by the present invention can be obtained, insofar as the parameters included in the conditional equations (1) to (5) take values near the defined ranges thereof, respectively.

In turn, it becomes possible to correct the aberrations more satisfactorily in the bent zoom lens according to the exemplary embodiment, when at least one of surfaces of lenses constituting the first, the third, or the fifth lens group is formed as an aspherical surface.

FIG. 1 is a cross-sectional view along an optical axis of a bent zoom lens configuration according to a first embodiment of the present invention. The bent zoom lens is configured to include, in an order from a side of an object (not shown), a first lens group GR1 having a positive refractive power, a second lens group GR2 having a negative refractive power, a third lens group GR3 having a positive refractive power, a fourth lens group GR4 having a negative refractive power, and a fifth lens group GR5 having a positive refractive power.

The first lens group GR1 is configured to include, in an order arranged from an object side, a single piece of meniscus lens L1 (front-side lens group) having a negative refractive power and having a convex surface directed toward the object side, a prism P that bends an optical path, and a single piece of double-convex lens L2 (rear-side lens group) having a positive refractive power.

The second lens group GR2 is configured to include, in an order arranged from an object side, a negative lens L3, a negative lens L4, and a positive lens L5. The negative lens L4 and positive lens L5 have respective lens surfaces cemented to each other to form a cemented lens.

The third lens group GR3 is configured to include, in an order arranged from an object side, a positive lens L6, a positive lens L7, and a negative lens L8. The positive lens L7 and negative lens L8 have respective lens surfaces cemented to each other to form a cemented lens. Arranged between the positive lens L6 and positive lens L7 is an iris diaphragm IR that adjusts an amount of light.

The fourth lens group GR4 is constituted of a single piece of negative lens L9. The fifth lens group GR5 is constituted of a single piece of positive lens L10.

Arranged between the fifth lens group GR5 and an image surface IMG are a filter FL such as made of an infrared cutting filter or low-pass filter, and a cover glass CG. Note that the cover glass CG is not indispensable, and may be omitted. Further, a light receiving face of an imaging device of CCD or the like is arranged at the position of the image surface IMG, when the bent zoom lens is installed in a digital still camera, for example.

The bent zoom lens according to the first embodiment includes the prism P that is arranged in the first lens group GR1 and that bends the optical path, so that the total length of the bent zoom lens can be shortened as compared with a lens system having a rectilinear optical path. Further, the lenses to be arranged at positions that are rarely affected by temperature change are preferably molded of plastic materials, to reduce a manufacturing cost. This applies to the lenses constituting the third lens group GR3 to the fifth lens group GR5 arranged closer to the image surface IMG.

In the bent zoom lens according to the first embodiment, zooming is conducted by moving the second lens group GR2 and the fourth lens group GR4 in a direction along the optical axis. Concretely, zooming from a wide-angle end to a telephoto end is conducted by moving the second lens group GR2 and the fourth lens group GR4 from an object side toward the image surface IMG side. Further, the bent zoom lens adopts a so-called rear focusing scheme where focusing is conducted by moving the fourth lens group GR4 in a direction along the optical axis. In this way, involved in zooming, focusing, or the like are only the second lens group and the fourth lens group arranged inside the lens system, so that the total length of the lens system is unchanged and kept constant even when zooming, focusing, or the like is conducted.

Listed below are various numerical value data concerning the bent zoom lens according to the first embodiment.

Figure 2:
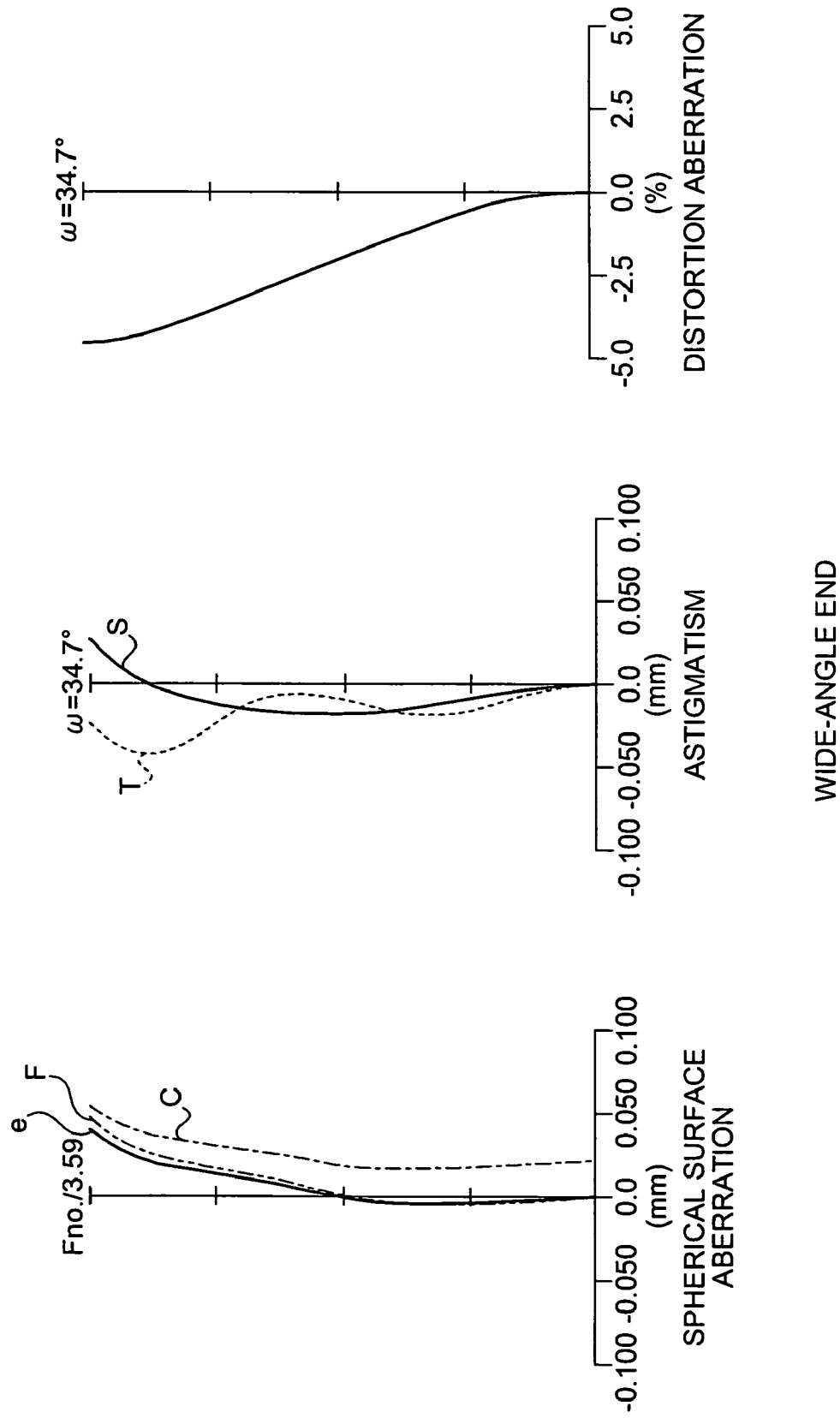
FIG. 2 is a graph of aberrations of the bent zoom lens according to the first embodiment at a wide-angle end.
Figure 3:
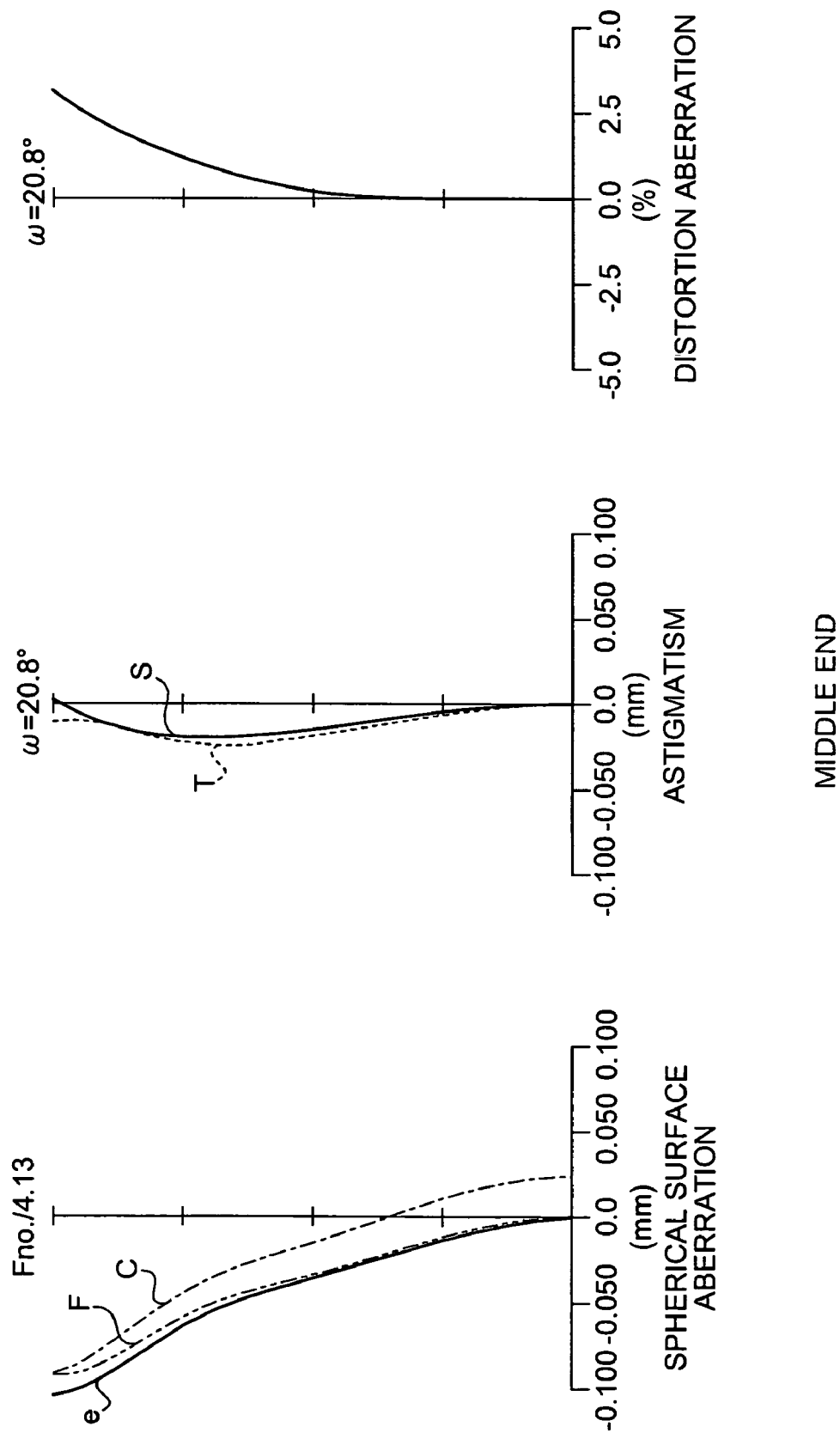
FIG. 3 is a graph of aberrations of the bent zoom lens according to the first embodiment at a middle end.
Figure 4:
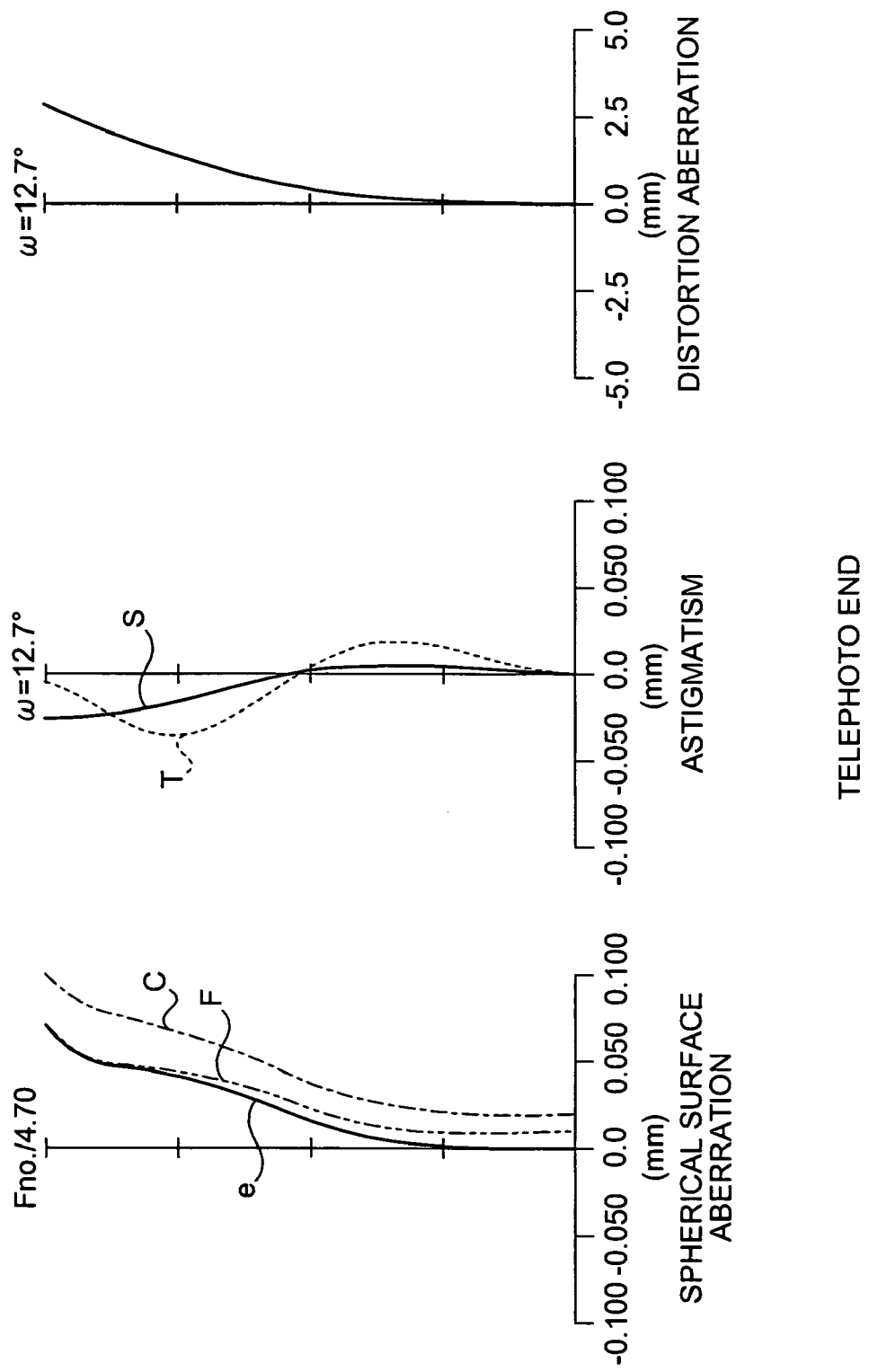
FIG. 4 is a graph of aberrations of the bent zoom lens according to the first embodiment at a telephoto end.

Focal length (f)=5.45 (wide-angle end) to 9.18 (middle end) to 15.55 (telephoto end)
F number (Fno.)=3.59 (wide-angle end) to 4.13 (middle end) to 4.70 (telephoto end)
Half angle of field ($\omega$)=34.67° (wide-angle end) to 20.82° (middle end) to 12.65° (telephoto end)
$|\beta_5^2 \times (1-\beta_{4W}^2)|=1.54$
$|\beta_5^2 \times (1-\beta_{4T}^2)|=1.52$
$|\beta_5|=0.018$
$|\beta_{2T}|=0.794$
$|R_{4a}|/R_{4b}=0.088$
$r_1=45.593$
    $d_1=0.500$    $nd_1=1.95825$    $vd_1=17.8$
$r_2=8.880$
    $d_2=1.550$
$r_3=\infty$
    $d_3=7.000$    $nd_2=1.77621$    $vd_2=49.4$
$r_4=\infty$
    $d_4=0.679$
$r_5=10.595$ (aspherical surface)
    $d_5=2.021$    $nd_3=1.62518$    $vd_3=58.0$
$r_6=-12.565$ (aspherical surface)
    $d_6=0.500$ (wide-angle end) to 3.506 (middle end) to 6.172 (telephoto end)
$r_7=-52.549$
    $d_7=0.450$    $nd_4=1.88815$    $vd_4=40.6$
$r_8=6.331$
    $d_8=0.897$
$r_9=-7.298$
    $d_9=0.821$    $nd_5=1.83944$    $vd_5=42.5$
$r_{10}=8.206$
    $d_{10}=1.566$    $nd_6=1.93323$    $vd_6=20.7$
$r_{11}=-13.514$
    $d_{11}=6.172$ (wide-angle end) to 3.167 (middle end) to 0.500 (telephoto end)
$r_{12}=6.674$ (aspherical surface)
    $d_{12}=1.256$    $nd_7=1.83972$    $vd_7=37.0$
$r_{13}=52.624$ (aspherical surface)
    $d_{13}=1.051$
$r_{14}=\infty$ (iris diaphragm)
    $d_{14}=1.250$
$r_{15}=8.344$ (aspherical surface)
    $d_{15}=3.001$    $nd_8=1.62518$    $vd_8=58.0$
$r_{16}=3.512$
    $d_{16}=0.450$    $nd_9=1.93323$    $vd_9=20.7$
$r_{17}=-47.631$
    $d_{17}=1.217$ (wide-angle end) to 2.919 (middle end) to 4.817 (telephoto end)
$r_{18}=-7.024$
    $d_{18}=0.450$    $nd_{10}=1.91048$    $vd_{10}=31.1$
$r_{19}=80.101$
    $d_{19}=4.521$ (wide-angle end) to 2.818 (middle end) to 0.920 (telephoto end)
$r_{20}=12.341$ (aspherical surface)
    $d_{20}=2.847$    $nd_{11}=1.52752$    $vd_{11}=55.5$
$r_{21}=-6.728$ (aspherical surface)
    $d_{21}=4.752$
$r_{22}=\infty$
    $d_{22}=1.000$    $nd_{12}=1.51872$    $vd_{12}=64.0$
$r_{23}=\infty$
    $d_{23}=1.120$
$r_{24}=\infty$
    $d_{24}=0.500$    $nd_{13}=1.51872$    $vd_{13}=64.0$
$r_{25}=\infty$
    $d_{25}=0.990$ -continued Conical coefficient (K) and aspherical surface
coefficients (A, B, C, and D):
(fifth surface)
$K=0$,
$A=-2.308880\times10^{-4}$, $B=1.565750\times10^{-5}$,
$C=-1.499180\times10^{-6}$, $D=5.310910\times10^{-8}$
(sixth surface)
$K=0$,
$A=7.085520\times10^{-5}$, $B=1.565750\times10^{-5}$,
$C=-1.396120\times10^{-6}$, $D=5.225130\times10^{-8}$
(twelfth surface)
$K=0$,
$A=1.981620\times10^{-4}$, $B=-6.264060\times10^{-5}$,
$C=8.678320\times10^{-6}$, $D=-7.288550\times10^{-7}$
(thirteenth surface)
$K=0$,
$A=2.076670\times10^{-4}$, $B=-7.789520\times10^{-5}$,
$C=9.883820\times10^{-6}$, $D=-8.472410\times10^{-7}$
(fifteenth surface)
$K=0$,
$A=8.232250\times10^{-6}$, $B=-1.354680\times10^{-5}$,
$C=4.367640\times10^{-6}$, $D=-3.745370\times10^{-8}$
(twentieth surface)
$K=0$,
$A=-1.017100\times10^{-3}$, $B=2.420480\times10^{-5}$,
$C=-4.532970\times10^{-6}$, $D=1.410640\times10^{-7}$
(twenty-first surface)
$K=0$,
$A=1.360710\times10^{-4}$, $B=3.747220\times10^{-5}$,
$C=-4.340720\times10^{-6}$, $D=1.043130\times10^{-7}$ Conical coefficient (K) and aspherical surface coefficients (A, B, C, and D):
(fifth surface)
$K=0$,
$A=-2.308880\times10^{-4}$, $B=1.720570\times10^{-5}$,
$C=-1.499180\times10^{-6}$, $D=5.310910\times10^{-8}$
(sixth surface)
$K=0$,
$A=7.085520\times^{-5}$, $B=1.565750\times10^{-5}$,
$C=-1.396120\times10^{-6}$, $D=5.22513\times10^{-8}$
(twelfth surface)
$K=0$,
$A=1.981620\times10^{-4}$, $B=-6.264060\times10^{-5}$,
$C=8.678320\times10^{-6}$, $D=-7.288550\times10^{-7}$
(thirteenth surface)
$K=0$,
$A=2.076670\times10^{-4}$, $B=-7.789520\times10^{-5}$,
$C=9.883820\times10^{-6}$, $D=-8.472410\times10^{-7}$
(fifteenth surface)
$K=0$,
$A=8.232250\times^{-6}$, $B=-1.354680\times10^{-5}$,
$C=4.367640\times^{-6}$, $D=-3.745370\times10^{-8}$
(twentieth surface)
$K=0$,
$A=-1.017100\times10^{-3}$, $B=2.420480\times10^{-5}$,
$C=-4.532970\times10^{-6}$, $D=1.410640\times10^{-7}$
(twenty-first surface)
$K=0$,
$A=1.360710\times10_{-4}$, $B=3.747220\times10^{-5}$,
$C=-4.340720\times10^{-6}$, $D=1.043130\times-7$ FIG. 2 is a graph of aberrations of the bent zoom lens according to the first embodiment at a wide-angle end. FIG. 3 is a graph of aberrations of the bent zoom lens according to the first embodiment at a middle end. FIG. 4 is a graph of aberrations of the bent zoom lens according to the first embodiment at a telephoto end.

A bent zoom lens according to a second embodiment of the present invention will be described hereinafter. Since the bent zoom lens according to the second embodiment has substantially the same configuration as that of the bent zoom lens according to the first embodiment shown in FIG. 1, detailed explanation and constitutional figures are omitted and only numerical value data and graphs of aberrations are shown.

Listed below are various numerical value data concerning the bent zoom lens according to the second embodiment.

Figure 5:
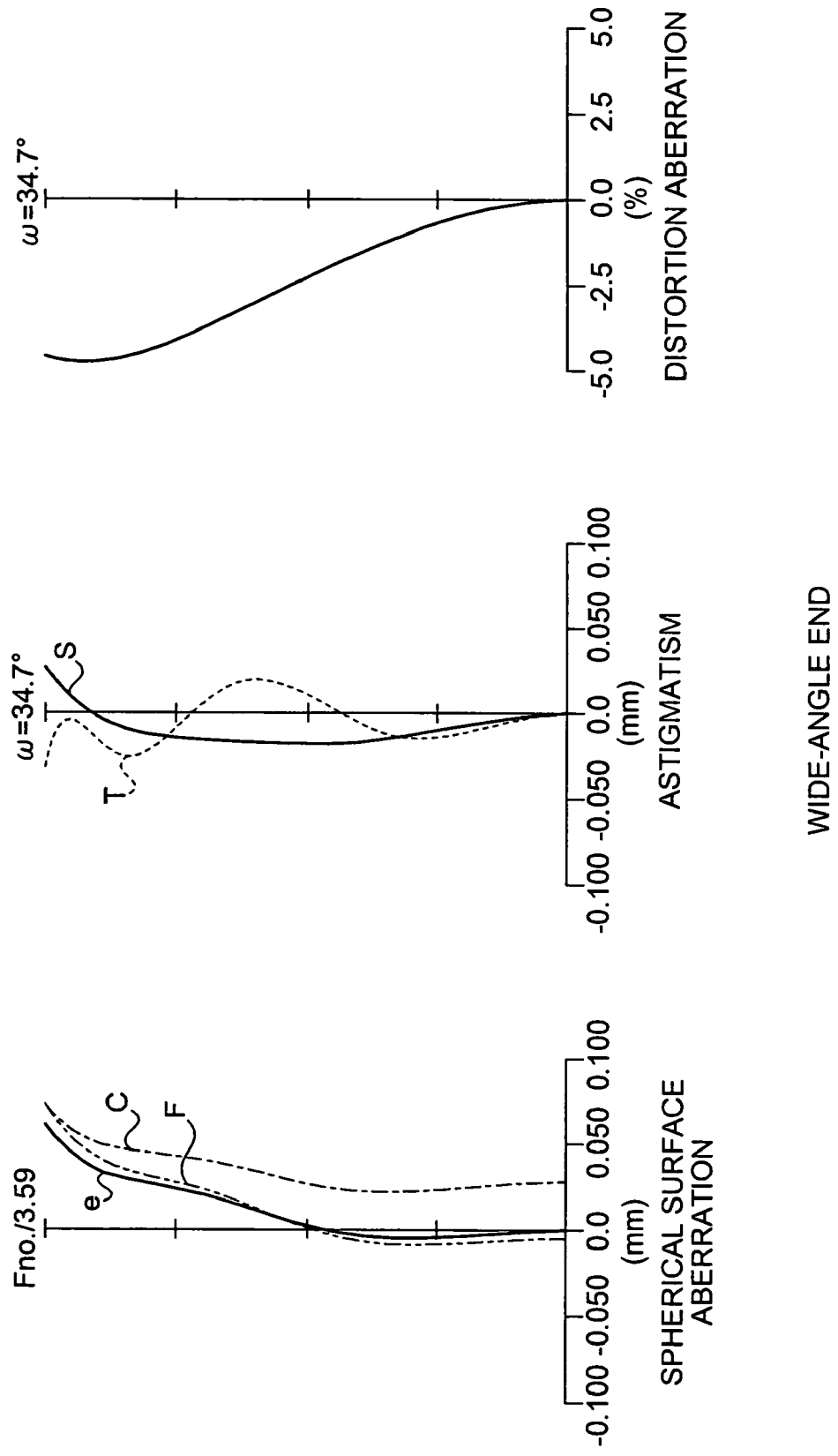
FIG. 5 is a graph of aberrations of a bent zoom lens according to the second embodiment of the present invention
Figure 6:
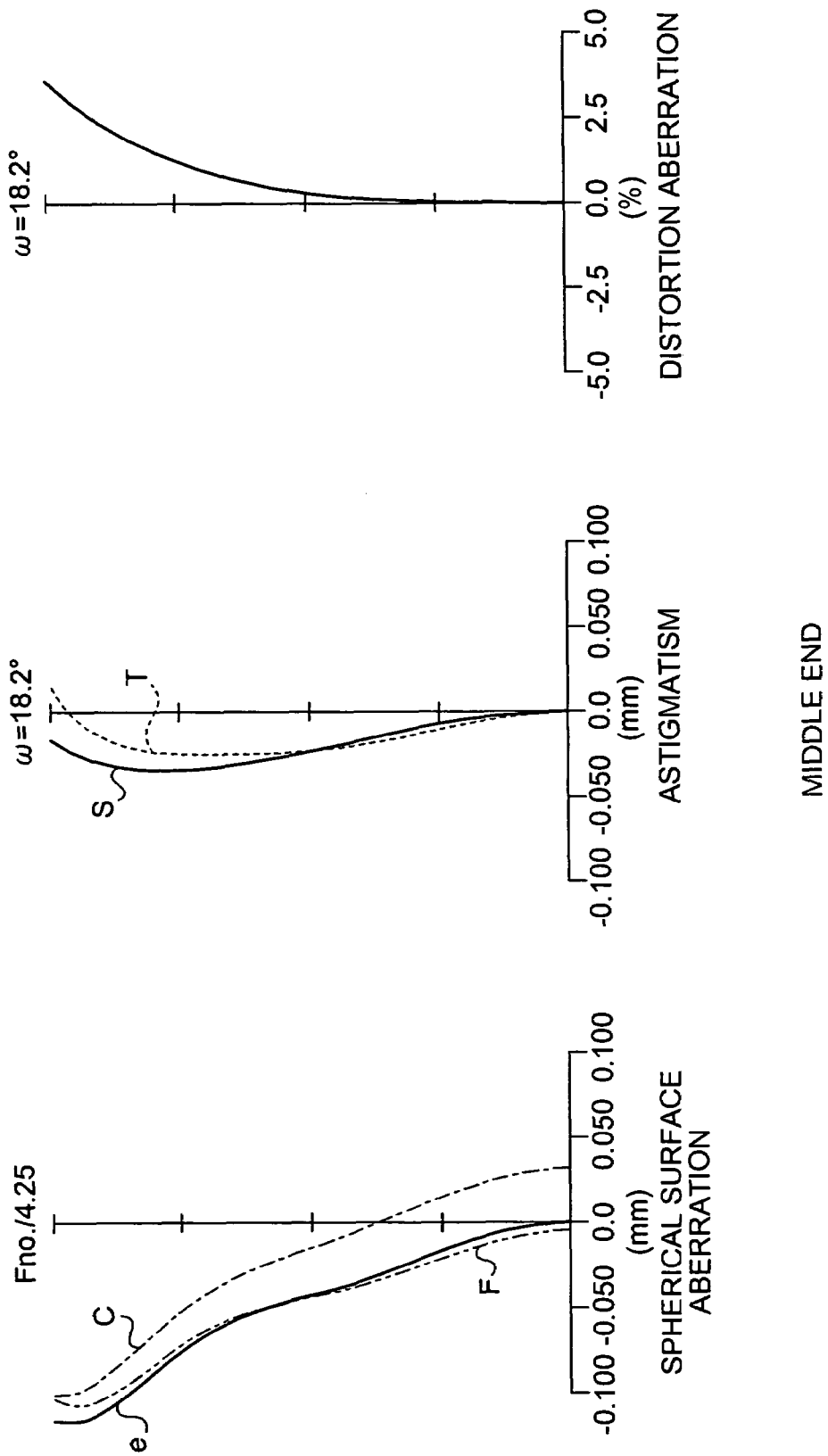
FIG. 6 is a graph of aberrations of the bent zoom lens according to the second embodiment at a middle end.
Figure 7:
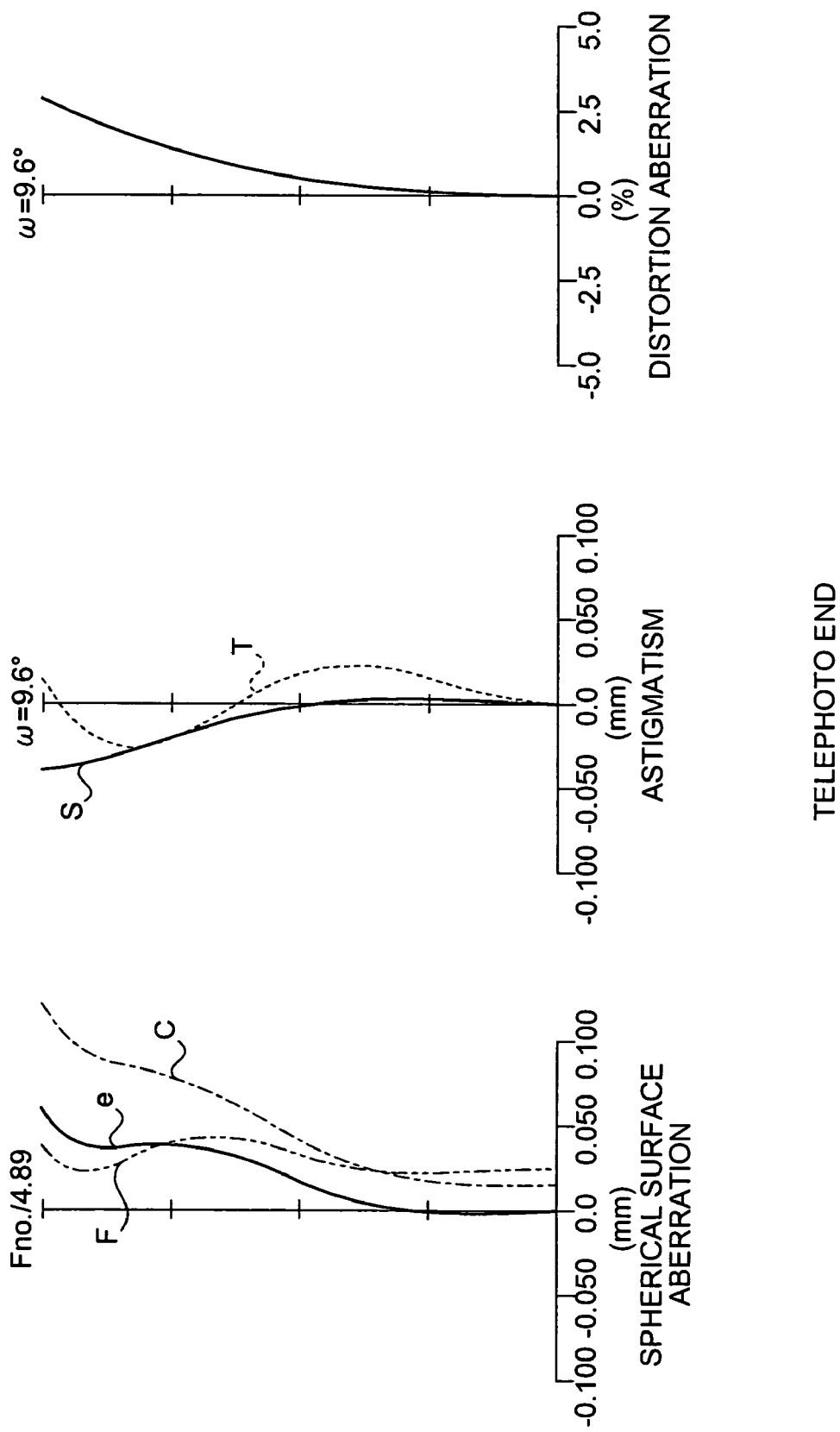
FIG. 7 is a graph of aberrations of the bent zoom lens according to the second embodiment at a telephoto end.

Focal length (f)=5.45 (wide-angle end) to 10.58 (middle end) to 20.65 (telephoto end)
F number (Fno.)=3.59 (wide-angle end) to 4.25 (middle end) to 4.89 (telephoto end)
Half angle of field ($\omega$)=34.66° (wide-angle end) to 18.19° (middle end) to 9.60° (telephoto end)
$|\beta_5^2\times(1-\beta_{4w}^2)|=1.72$
$|\beta_5^2\times(1-\beta_{4T}^2)|=1.71$
$|\beta_5|=0.004$
$|\beta_{2T}|=0.888$
$|r_{4a}|/r_{4b}=0.564$
$r_1=75.870$
   $d_1=0.500$    $nd_1=1.95825$    $vd_1=17.8$
$r_2=11.800$
   $d_2=1.612$
$r_3=\infty$
   $d_3=7.875$    $nd_2=1.77621$    $vd_2=49.4$
$r_4=\infty$
   $d_4=0.547$
$r_5=11.465$ (aspherical surface)
   $d_5=2.228$    $nd_3=1.62518$    $vd_3=58.0$
$r_6=-15.468$ (aspherical surface)
   $d_6=0.500$ (wide-angle end) to 4.604 (middle end) to 8.146 (telephoto end)
$r_7=-92.411$
   $d_7=0.450$    $nd_4=1.88815$    $vd_4=40.6$
$r_8=6.282$
   $d_8=1.021$
$r_9=-11.695$
   $d_9=0.768$    $nd_5=1.77621$    $vd_5=49.4$
$r_{10}=6.714$
   $d_{10}=1.487$   $nd_6=1.93323$    $vd_6=20.7$
$r_{11}=-42.846$
   $d_{11}=8.146$ (wide-angle end) to 4.042 (middle end) to 0.500 (telephoto end)
$r_{12}=7.215$ (aspherical surface)
   $d_{12}=1.268$   $nd_7=1.83972$    $vd_7=37.0$
$r_{13}=187.471$ (aspherical surface)
   $d_{13}=1.013$
$r_{14}=\infty$ (iris diaphragm)
   $d_{14}=1.291$
$r_{15}=10.556$ (aspherical surface)
   $d_{15}=3.016$   $nd_8=1.62518$    $vd_8=58.0$
$r_{16}=-3.731$
   $d_{16}=0.450$   $nd_9=1.93323$    $vd_9=20.7$
$r_{17}=-28.397$
   $d_{17}=0.965$ (wide-angle end) to 2.952 (middle end) to 5.005 (telephoto end)
$r_{18}=-9.846$
   $d_{18}=0.450$   $nd_{10}=1.91048$   $vd_{10}=31.1$
$r_{19}=17.470$
   $d_{19}=5.185$ (wide-angle end) to 3.198 (middle end) to 1.144 (telephoto end)
$r_{20}=9.462$ (aspherical surface)
   $d_{20}=2.887$   $nd_{11}=1.52752$   $vd_{11}=55.5$
$r_{21}=-8.479$ (aspherical surface)
   $d_{21}=4.926$
$r_{22}=\infty$
   $d_{22}=1.000$   $nd_{12}=1.51872$   $vd_{12}=64.0$
$r_{23}=\infty$
   $d_{23}=1.120$
$r_{24}=\infty$
   $d_{24}=0.500$   $nd_{13}=1.51872$   $vd_{13}=64.0$
$r_{25}=\infty$
   $d_{25}=0.990$ -continued Conical coefficient (K) and aspherical surface
coefficients (A, B, C, and D)
(fifth surface)
K=0,
A=−1.426860×10$^{-4}$, B=2.984890×10$^{-6}$,
C=−2.463340×10$^{-7}$, D=6.555250×10$^{-9}$
(sixth surface)
K=0,
A=7.164500×10$^{-5}$, B=2.266100×10$^{-5}$,
C=−2.047680×10$^{-7}$, D=6.165980×10$^{-9}$
(twelfth surface)
K=0,
A=2.380720×10$^{-4}$, B=−7.667110×10$^{-5}$,
C=9.308300×10$^{-6}$, D=−8.829670×10$^{-7}$
(thirteenth surface)
K=0,
A=3.554480×10$^{-4}$, B=−9.361780×10$^{-5}$,
C=8.692790×10$^{-6}$, D=−8.567480×10$^{-7}$
(fifteenth surface)
K=0,
A=2.112130×10$^{-4}$, B=−2.790630×10$^{-5}$,
C=3.150180×10$^{-6}$, D=−1.076670×10$^{-7}$
(twentieth surface)
K=0,
A=−6.138030×10$^{-4}$, B=−1.736140×10$^{5}$,
C=1.438110×10$^{-6}$, D=2.733190×10$^{×8}$
(twenty-first surface)
K=0,
A=2.689920×10$^{-4}$, B=9.419830×10$^{-6}$,
C=−1.861100×10$^{-6}$, D=1.390340×10$^{7}$ FIG. 5 is a graph of aberrations of the bent zoom lens according to the second embodiment at a wide-angle end. FIG. 6 is a graph of aberrations of the bent zoom lens according to the second embodiment at a middle end. FIG. 7 is a graph of aberrations of the bent zoom lens according to the second embodiment at a telephoto end.

A bent zoom lens according to a third embodiment of the present invention will be described hereinafter. Since also the bent zoom lens according to the third embodiment has substantially the same configuration as that of the bent zoom lens according to the first embodiment shown in FIG. 1 except that the fifth lens group according to the third embodiment includes one more lens than the bent zoom lens according to the first embodiment, detailed explanation and constitutional figures are omitted and only numerical value data and graphs of aberrations are shown.

Listed below are various numerical value data concerning the bent zoom lens according to the third embodiment.

Focal length (f)=4.79 (wide-angle end) to 12.42 (middle end) to 32.43 (telephoto end)
F number (Fno.)=3.55 (wide-angle end) to 4.33 (middle end) to 5.20 (telephoto end)
Half angle of field (1ω)=38.23° (wide-angle end) to 15.76° (middle end) to 6.23° (telephoto end)
|β$_5$$^2$×(1−β$_{4w}$$^2$)|=1.56
|β$_5$$^2$×(1−β$_{4T}$$^2$)|=1.60
|β$_5$|=0.024
|β$_{2T}$|=0.903
|R$_{4a}$/R$_{4b}$=0.484
r$_1$=62.604
  d$_1$=1.200  nd$_1$=1.93323  vd$_1$=20.7
r$_2$=21.674
  d$_2$=2.796
r$_3$=∞
  d$_3$=14.019  nd$_2$=1.85505  vd$_2$=23.6
r$_4$=∞
  d$_4$=0.150

-continued r$_5$=16.009 (aspherical surface)
  d$_5$=3.432  nd$_3$=1.58680  vd$_3$=58.9
r$_6$=−38.666 (aspherical surface)
  d$_6$=0.500 (wide-angle end) to 9.740 (middle end) to 16.568 (telephoto end)
r$_7$=43.895
  d$_7$=0.550  nd$_4$=1.91048  vd$_4$=31.1
r$_8$=5.931
  d$_8$=2.228
r$_9$=−24.341
  d$_9$=0.867  nd$_5$=1.66152  vd$_5$=50.6
r$_{10}$7.007
  d$_{10}$=2.020  nd$_6$=1.93323  vd$_6$=20.7
r$_{11}$=66.439
  d$_{11}$=16.568 (wide-angle end) to 7.328 (middle end) to 0.500 (telephoto end)
r$_{12}$=11.326 (aspherical surface)
  d$_{12}$=1.518  nd$_7$=1.82918  vd$_7$=23.9
r$_{13}$=851.729 (aspherical surface)
  d$_3$=1.038
r$_{14}$=∞ (iris diaphragm)
  d$_{14}$=1.000
r$_{15}$=10.514 (aspherical surface)
  d$_{15}$=2.124  nd$_8$=1.58547  vd$_8$=59.2
r$_{16}$=−4.667
  d$_{16}$=0.450  nd$_9$=1.93323  vd$_9$=20.7
r$_{17}$=−18.205
  d$_{17}$=0.894 (wide-angle end) to 3.681 (middle end) to 6.893 (telephoto end)
r$_{18}$=−12.175
  d$_{18}$0.450  nd$_{10}$=1.83944  vd$_{10}$=42.5
r$_{19}$=25.163
  d$_{19}$=7.974 (wide-angle end) to 5.186 (middle end) to 1.974 (telephoto end)
r$_{20}$=11.915
  d$_{20}$=0.632  nd$_{11}$=1.76857  vd$_{11}$=26.4
r$_{21}$8.457
  d$_{21}$0.150
r$_{22}$=8.800 (aspherical surface)
  d$_{22}$=3.728  nd$_{12}$=1.52752  vd$_{12}$=55.5
r$_{23}$=−10.125 (aspherical surface)
  d$_{23}$=8.272
r$_{24}$=∞
  d$_{24}$=1.000  nd$_{13}$=1.51872  vd$_{13}$=64.0
r$_{25}$=∞
  d$_{25}$=1.120
r$_{26}$=∞
  d$_{26}$=0.500  nd$_{14}$=1.51872  vd$_{14}$=64.0
r$_{27}$=∞
  d$_{27}$=0.990
Conical coefficient (K) and aspherical surface
coefficients (A, B, C, and D):
(fifth surface)
K=0,
A=−3.617190×10$^{-5}$, B=2.671750×10$^{-7}$,
C=−4.142870×10$^{-9}$, D=−1.456400×10$^{-11}$
(sixth surface)
K=0,
A=4.611460×10$^{-6}$, B=4.500930×10$^{-7}$,
C=−8.407020×10$^{-9}$, D=2.606650×10$^{-11}$
(twelfth surface)
K=0,
A=2.320840×10$^{-4}$, B=−4.880900×10$^{-5}$,
C=7.926510×10$^{-7}$, D=−1.237070×10$^{-7}$
(thirteenth surface)
K=0,
A=−3.677400×10$^{-5}$, B=−7.188210×10$^{-5}$,
C=0, D=0
(fifteenth surface)
K=0,
A=3.916080×10$^{-5}$, B=−7.366660×10$^{-6}$,
C=−4.213550×10$^{-6}$, D=4.854460×10$^{-7}$
(twenty-second surface)
K=0,
A=−1.182780×10$^{-4}$, B=−1.592040×10$^{-5}$,
C=1.164590×10$^{-6}$, D=−1.237840×10$^{-8}$
(twenty-third surface)
K=0, -continued

A=2.701630×10⁻⁴,  B=−1.332680×10⁻⁵,
C=4.884570×10⁻⁷,  D=9.343980×10⁻⁹

Conical coefficient (K) and aspherical surface coefficients (A, B, C, and D):
(fifth surface)
K=0,
A=−3.617190×10⁻⁵, B=2.671750×10⁻⁷,
C=−4.142870×10⁻⁹, D=−1.456400×10⁻¹¹
(sixth surface)
K=0,
A=4.611460×10⁻⁴, B=4.500930×10⁻⁷,
C=−8.407020×10⁻⁹, D=2.606650×10⁻¹¹
(twelfth surface)
K=0,
A=2.320840×⁻⁴, B=−4.880900×10⁻⁵,
C=7.926510×⁻⁷, D=−1.237070×10⁻⁷
(thirteenth surface)
K=0,
A=−3.677400×10⁻⁵, B=−7.188210×10⁻⁵,
C=0, D=0
(fifteenth surface)
K=0,
A=3.916080×10⁻⁵, B=−7.366660×10⁻⁶,
C=−4.213550×10⁻⁶, D=4.854460×10⁻⁷
(twenty-second surface)
K=0,
A=−1.182780×10⁻⁴, B=−1.592040×10⁻⁵,
C=1.164590×10⁻⁶, D=−1.237840×10⁻⁸
(twenty-third surface)
K=0,
A=2.701630×10⁻⁴, B=−1.332680×10⁻⁵,
C=4.884570×10⁻⁷, D=9.343980×10⁻⁹

Figure 8:
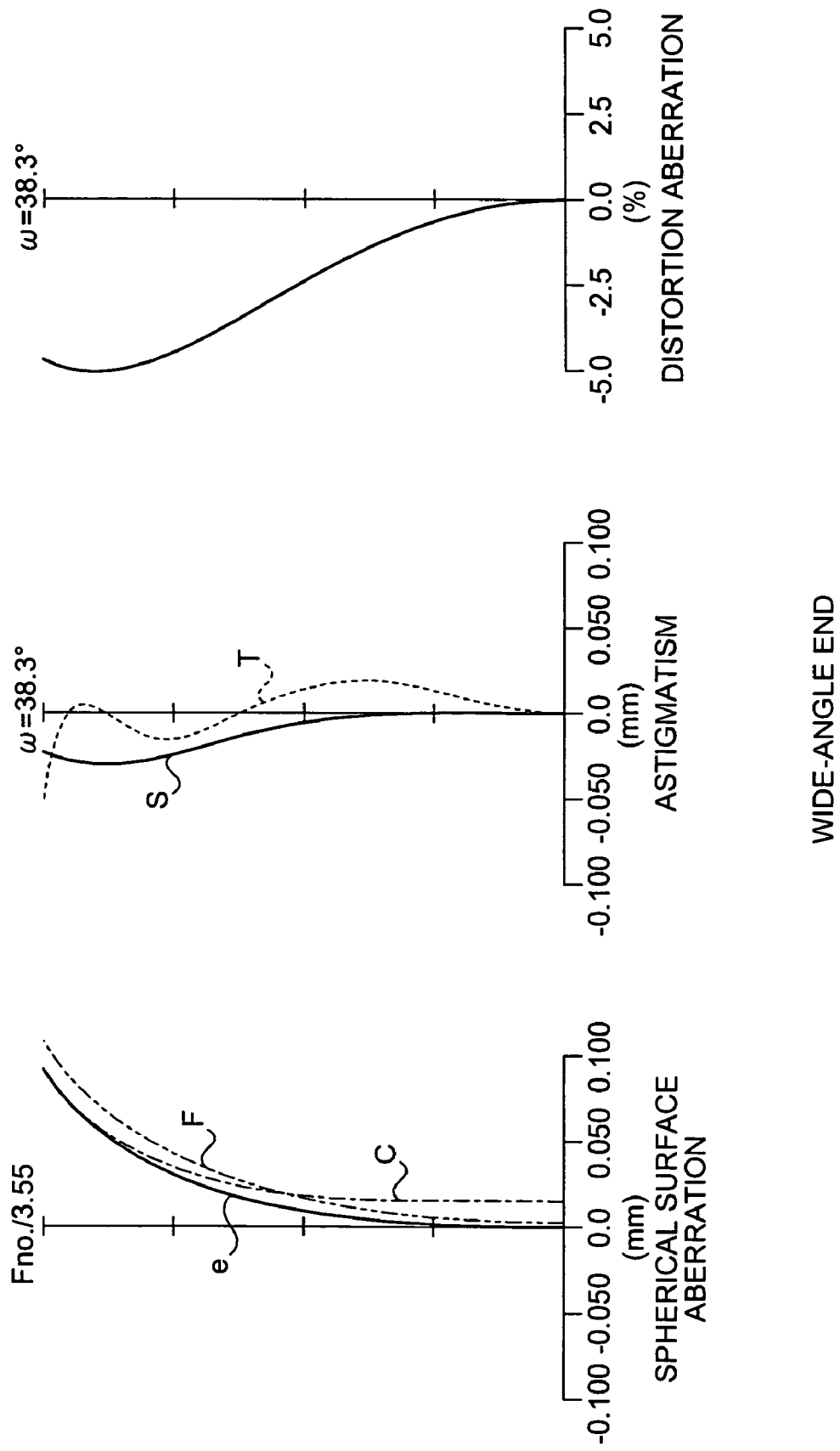
FIG. 8 is a graph of aberrations of a bent zoom lens according to the third embodiment of the present invention at a wide-angle end.
Figure 9:
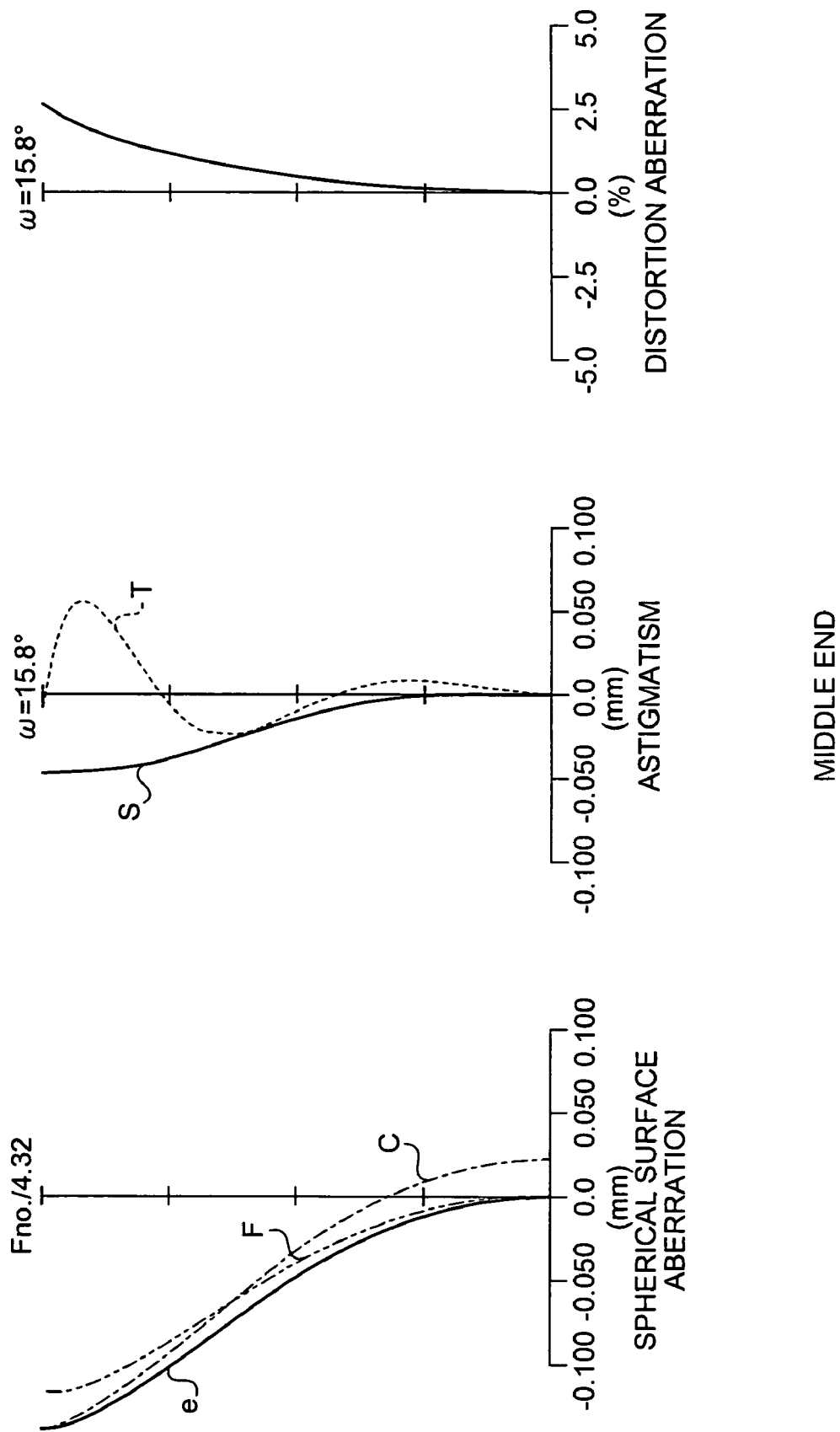
FIG. 9 is a graph of aberrations of the bent zoom lens according to the third embodiment at a middle end.
Figure 10:
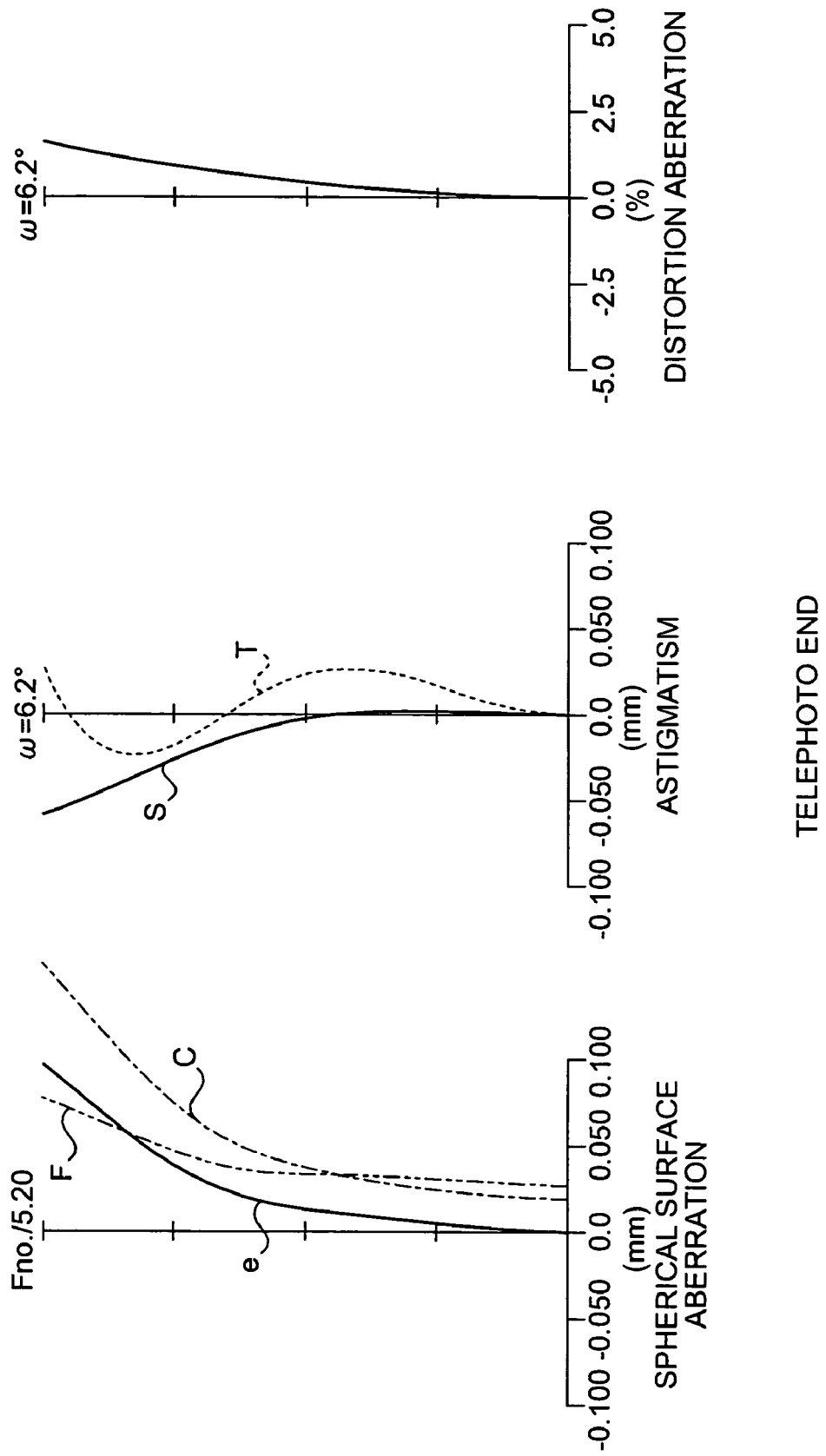
FIG. 10 is a graph of aberrations of the bent zoom lens according to the third embodiment at a telephoto end.

FIG. 8 is a graph of aberrations of the bent zoom lens according to the third embodiment at a wide-angle end. FIG. 9 is a graph of aberrations of the bent zoom lens according to the third embodiment at a middle end. FIG. 10 is a graph of aberrations of the bent zoom lens according to the third embodiment at a telephoto end.

Note that, in the numerical value data, $r_1$, $r_2$ and so forth represent radii of curvature of the lenses, iris diaphragm surface, and the like, respectively; $d_1$, $d_2$, and so forth represent wall thicknesses or surface separations of the lenses, iris diaphragm, and the like, respectively; $nd_1$, $nd_2$, and so forth represent refractive indexes of lenses at d-line, respectively; and $vd_1$, $vd_2$, and so forth represent Abbe numbers of lenses, respectively.

The aspherical surface shapes can be each represented by the following equation, where an X axis is set in an optical axis direction, an H axis is set in a direction orthogonal to the optical axis, and a traveling direction of light is positive:

$$X = \frac{H^2/r}{1+\sqrt{1-(KH^2/r^2)}} + AH^4 + BH^6 + CH^8 + DH^{10} \quad (6)$$

where r represents a paraxial radius of curvature, K represents a conical coefficient; and A, B, C, and D represent aspherical surface coefficients at fourth, sixth, eighth, and tenth orders, respectively.

As explained above, the bent zoom lenses according to the embodiments are each downsized and made excellent in image-formation quality by meeting the conditional equations.

Further, the bent zoom lenses according to the embodiments are each configured to include lenses formed with aspherical surfaces, respectively, thereby enabling various aberrations to be satisfactorily corrected by a small number of lenses.

Furthermore, the lenses constituting the third to the fifth lens groups arranged at positions that are rarely affected by temperature change are molded of plastic materials, thereby enabling a reduced manufacturing cost.

According to the embodiments described above, it is possible to provide a bent zoom lens that is compact and has excellent image-forming performance. Moreover, it is possible to provide a high performance bent zoom lens capable of suppressing various aberrations.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2005-367739 filed in Japan on Dec. 21, 2005.

What is claimed is:

1. A bent zoom lens comprising:
   a first lens group including
      a front-side lens group having a negative refractive power,
      an optical member that bends an optical path, and
      a rear-side lens group having a positive refractive power;
   a second lens group;
   a third lens group;
   a fourth lens group; and
   a fifth lens group, the first lens group, the second lens group, the third lens group, the fourth lens group, and the fifth lens group arranged in order from an object side,
   wherein a value of $|\beta_5^2 \times (1-\beta_{4w}^2)|$ is set to be from approximately 1.0 to 2.0, and a value of $|\beta_5^2 \times (1-\beta_{4T}^2)|$ is set to be approximately from 1.0 to 2.0, where $\beta_{4W}$ represents an image-formation magnification of the fourth lens group at a wide-angle end when a distance to the object is infinite, $\beta_{4T}$ represents an image-formation magnification of the fourth lens group at a telephoto end when a distance to the object is infinite; and $\beta_5$ represents an image-formation magnification of the fifth lens group when a distance to the object is infinite.

2. The bent zoom lens according to claim 1, wherein a value of $|\beta_5|$ is set to be approximately 0.5 or less.

3. The bent zoom lens according to claim 1, wherein a value of $|\beta_{2T}|$ is set to be approximately 1.0 or less, where $\beta_{2T}$ represents an image-formation magnification of the second lens group at a telephoto end when a distance to the object is infinite.

4. The bent zoom lens according to claim 1, wherein a value of $|R_{4a}/R_{4b}|$ is set to be approximately 1.1 or less, $R_{4a}$ represents a radius of curvature of a most object side surface of lenses constituting the fourth lens group, and $R_{4b}$ represents a radius of curvature of a most image side surface of the lenses.

5. The bent zoom lens according to claim 3, wherein a value of $|\beta_5|$ is set to be approximately 0.5 or less.

6. The bent zoom lens according to claim 2, wherein a value of $|R_{4a}|/R_{4b}$ is set to be approximately 1.1 or less, where $R_{4a}$ represents a radius of curvature of a most object side surface of lenses constituting the fourth lens group, and $R_{4b}$ represents a radius of curvature of a most image side surface of the lenses.

7. The bent zoom lens according to claim 3, wherein
a value of $|R_{4a}|/R_{4b}$ is set to be approximately 1.1 or less, where $R_{4a}$ represents a radius of curvature of a most object side surface of lenses constituting the fourth lens group, and $R_{4b}$ represents a radius of curvature of a most image side surface of the lenses.

8. The bent zoom lens according to claim 5, wherein
a value of $|R_{4a}|/R_{4b}$ is set to be approximately 1.1 or less, where $R_{4a}$ represents a radius of curvature of a most object side surface of lenses constituting the fourth lens group, and $R_{4b}$ represents a radius of curvature of a most image side surface of the lenses.

9. A bent zoom lens comprising:
a first lens group including
  a front-side lens group having a negative refractive power,
  an optical member that bends an optical path, and
  a rear-side lens group having a positive refractive power;
a second lens group;
a third lens group;
a fourth lens group; and
a fifth lens group, the first lens group, the second lens group, the third lens group, the fourth lens group, and the fifth lens group arranged in order from an object side,
wherein a value of $|\beta_5|$ is set to be approximately 0.5 or less, where $\beta_5$ represents an image-formation magnification of the fifth lens group when a distance to the object is infinite.

10. A bent zoom lens comprising:
a first lens group including
  a front-side lens group having a negative refractive power,
  an optical member that bends an optical path, and
  a rear-side lens group having a positive refractive power;
a second lens group;
a third lens group;
a fourth lens group; and
a fifth lens group, the first lens group, the second lens group, the third lens group, the fourth lens group, and the fifth lens group arranged in order from an object side,
wherein a value of $|\beta_{2T}|$ is set to be approximately 1.0 or less, where $\beta_{2T}$ represents an image-formation magnification of the second lens group at a telephoto end when a distance to the object is infinite.

11. A bent zoom lens comprising:
a first lens group including
  a front-side lens group having a negative refractive power,
  an optical member that bends an optical path, and
  a rear-side lens group having a positive refractive power;
a second lens group;
a third lens group;
a fourth lens group; and
a fifth lens group, the first lens group, the second lens group, the third lens group, the fourth lens group, and the fifth lens group arranged in order from an object side,
wherein a value of $|R_{4a}|/R_{4b}$ is set to be approximately 1.1 or less, where $R_{4a}$ represents a radius of curvature of a most object side surface of lenses constituting the fourth lens group, and $R_{4b}$ represents a radius of curvature of a most image side surface of the lenses.

12. The bent zoom lens according to claim 11, wherein at least one of surfaces of lenses constituting the first, the third, or the fifth lens group is formed as an aspherical surface.

* * * * *